June 17, 1958 — R. W. NARAMORE — 2,838,813
BEADING STRIP
Filed March 29, 1956
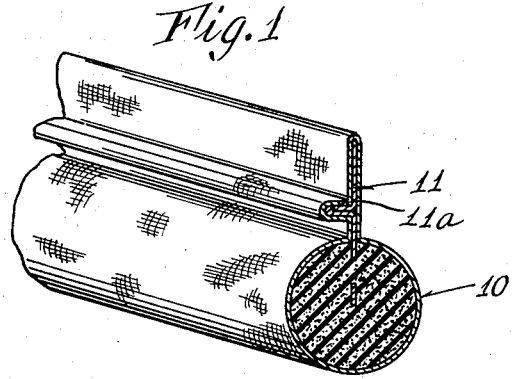
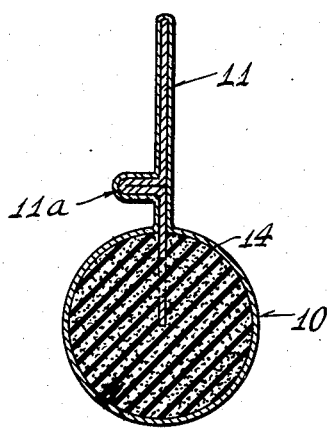
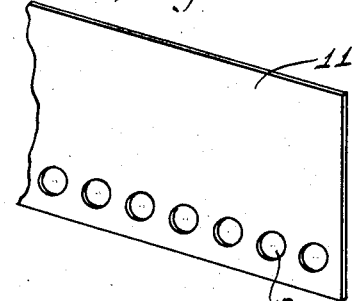
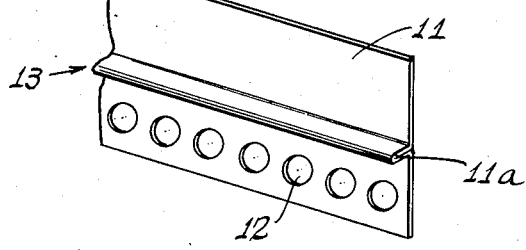
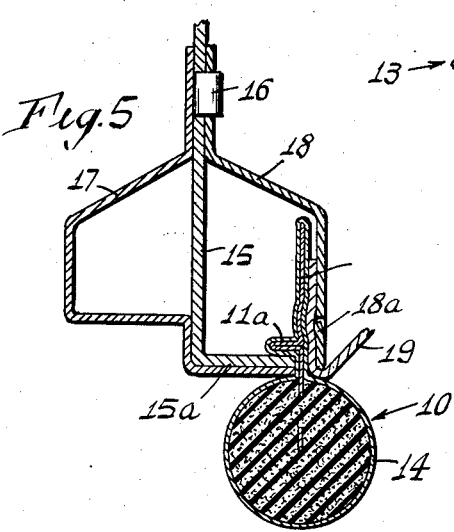
INVENTOR.
Robert W. Naramore
BY
Johnson and Kline
ATTORNEYS United States Patent Office 2,838,813
Patented June 17, 1958

2,838,813
BEADING STRIP

Robert W. Naramore, Bridgeport, Conn., assignor to Bridgeport Fabrics, Inc., Bridgeport, Conn., a corporation of Connecticut Application March 29, 1956, Serial No. 574,669

5 Claims. (Cl. 20—69)

The present invention relates to beading strips and more particularly to beading strips for weatherproofing and/or ornamental purposes.

Beading strips of the type herein disclosed have been used as a means for waterproofing and/or providing ornamentation about openings in automobile or the like bodies. It has been a problem to provide such a strip which could be readily installed and yet easily and cheaply manufactured.

Heretofore, it was believed necessary to successfully mount beading strips of the present type to include a resilient metallic member or wires in the attaching flange for the strip such as are shown in U. S. Patent No. 2,659,117. I have discovered, however, that a successful beading strip can be formed without wire in the attaching strip. This is accomplished by providing a stiff paper, fabric or fiber attaching strip having one end secured to a resilient bead and having a longitudinal fold forming a projecting rib extending from the plane of the attaching strip and disposed between the bead and the opposite edge of the strip and by securing the strip on each side of the fold together by means of a cover for the beading strip. If desired, the inner surface of the fold in the attaching strip may be adhered together.

A feature of the beading strip of the present invention resides in the fact that the strip can be made economically and yet provide the full advantage of a strip having the wire therein.

Other features and advantages of the invention will be apparent from the specification and claims when considered in connection with the drawings in which:

Figure 1 shows a perspective view partly in section of the head and attaching strip.

Fig. 2 is a sectional view taken through the beading strip.

Fig. 3 is a perspective view of the attaching strip prior to being folded.

Fig. 4 is a perspective view of the attaching strip having the fold therein.

Fig. 5 is a fragmentary sectional view showing the beading strip installed.

The beading strip of the present invention comprises a bead 10 of compressible material, herein illustrated as sponge rubber, having a relatively stiff attaching strip or flange 11 secured thereto.

In the herein preferred form of the invention the attaching strip, which can be made of stiff paper, cardboard, fabric or fibrous material, is provided with a plurality of apertures 12 along one edge which are disposed within the bead to securely anchor the attaching strip to the bead, with the remainder of the strip projecting outwardly therefrom. The strip can be anchored to the bead by adhering sections of sponge rubber together through the apertures and to the edge of the strip or by inserting the strip into the mold as the sponge rubber bead is blown to cause the rubber to be interlocked with and adhered to the strip.

The attaching strip of the present invention is formed from flat stock as shown in Fig. 3, and being a nonmetallic strip can be folded easily, as shown in Fig. 4, to a longitudinally extending folded portion 11a which produces a rib 13 projecting from the plane of the attaching strip so as to cooperate with the automobile body, as shown in Fig. 5, to mount the beading strip on the body. The material in the fold of the attaching strip may be secured together by adhesive. However, in the preferred form of the invention a cover 14 is provided which extends around the bead and over the attaching strip, which cover may be fabric, rubber or the like, to embrace the bead and attaching strip, as shown in Fig. 2. The cover is adhered at least to the attaching strip. As is clear from Fig. 2, it is secured to the side of the attaching strip opposite the rib and adjacent each side of the fold so that it holds the bottom of the fold from separating and a very strong rib is provided capable of supporting the beading strip in position on the automobile body. Also, the cover is adhered to the outer surface of the rib and the adjacent strip portions and tends to reenforce and hold the rib in its projecting position.

The beading strip of the present invention is installed, as shown in Fig. 5, about the opening of an automobile body. The body has a mounting frame or member 15 provided with a flange 15a and having lanced-out tongues 16 which project inwardly. The outer side of the frame member is covered with an outer trim 17 for receiving the door or a like closure. Overlying the inner face of the mounting member is a keeper plate 18 which is locked in place by the tongues passing through openings in the plate and folded thereover. The keeper plate extends down so as to overlie the end of the flange. It can be installed after the beading strip has been put in place or the strip can be inserted between the plate and the edges of the flange after the plate has been secured. The surface of the keeper plate which overlies the strip has lanced-out barbs 18a which face inwardly and aid in holding the beading strip against unintentional removal and for permitting ready insertion of the strip. The barbs also aid in holding the top cover 19 in place when it is carried around the edge of the plate and tucked in along the side of the strip.

It will be seen, therefore, that the present invention provides a relatively inexpensive beading strip capable of being quickly and easily mounted around the opening of an automobile or the like and supporting the bead in position on the body to produce an effective seal. Since the attaching strip is of nonmetallic material, it can be readily folded and secured in place to produce a less expensive construction and one which can be more economically made which is an important factor in articles of this type which are highly competitive.

Variations and modifications may be made within the scope of the claims and portions of the improvements may be used without others.

I claim:

1. A beading strip comprising a flexible bead of compressible material; a stiff, non-metallic attaching strip having one edge secured to the bead with the strip projecting therefrom, said strip having a folded loop portion therein with the edges of the fold forming the loop being juxtaposed and lying in the plane of the attaching strip and providing a longitudinally extending portion intermediate the edges of the attaching strip projecting from the plane of the strip and cooperating with the bead to form a flange-receiving channel for mounting the beading strip; and a cover enclosing the bead and attaching strip, said cover being secured to the side of the attaching strip opposite the projecting fold adjacent each side of such fold to hold the juxtaposed edges thereof from spreading.

2. A beading strip comprising a flexible bead of compressible material; a stiff, paper attaching strip having one edge secured to the bead with the strip projecting therefrom, said strip having a folded loop portion therein with the edges of the fold forming the loop being juxtaposed and lying in the plane of the attaching strip and providing a longitudinally extending portion intermediate the edges of the attaching strip projecting from the plane of the strip and cooperating with the bead to form a flange-receiving channel for mounting the beading strip; and a cover enclosing the bead and attaching strip, said cover being secured to the side of the attaching strip opposite the projecting fold adjacent each side of such fold to hold the juxtaposed edges thereof from spreading.

3. A beading strip comprising a flexible bead of compressible material; a stiff, fiber attaching strip having one edge secured to the bead with the strip projecting therefrom, said strip having a folded loop portion therein with the edges of the fold forming the loop being juxtaposed and lying in the plane of the attaching strip and providing a longitudinally extending portion intermediate the edges of the attaching strip projecting from the plane of the strip and cooperating with the bead to form a flange-receiving channel for mounting the beading strip; and a cover enclosing the bead and attaching strip, said cover being secured to the side of the attaching strip opposite the projecting fold adjacent each side of such fold to hold the juxtaposed edges thereof from spreading.

4. A beading strip comprising a flexible bead of compressible material; a stiff, non-metallic fabric attaching strip having one edge secured to the bead with the strip projecting therefrom, said strip having a folded loop portion therein with the edges of the fold forming the loop being juxtaposed and lying in the plane of the attaching strip and providing a longitudinally extending portion intermediate the edges of the attaching strip projecting from the plane of the strip and cooperating with the bead to form a flange-receiving channel for mounting the beading strip; and a cover enclosing the bead and attaching strip, said cover being secured to the side of the attaching strip opposite the projecting fold adjacent each side of such fold to hold the juxtaposed edges thereof from spreading.

5. A beading strip comprising a flexible bead of compressible material; a stiff, nonmetallic attaching strip having one edge secured to the bead with the strip projecting therefrom, said strip having a folded portion therein with the edges of the fold forming the loop being juxtaposed and lying in the plane of the attaching strip and providing a longitudinally extending portion intermediate the edges of the attaching strip projecting from the plane of the strip with the inner surfaces of the fold in the strip adhered together, said folded portion cooperating with the bead to form a flange-receiving channel for mounting the beading strip; and a cover enclosing the bead and attaching strip, said cover being secured to the side of the attaching strip opposite the projecting fold adjacent each side of such fold to hold the juxtaposed edges thereof from spreading.

References Cited in the file of this patent

UNITED STATES PATENTS

| 2,347,158 | Spraragen | Apr. 18, 1944 |
| 2,400,470 | Spraragen | May 14, 1946 |
| 2,659,117 | Spraragen | Nov. 17, 1953 |
| 2,760,897 | Owens | Aug. 28, 1956 |

FOREIGN PATENTS

| 819,828 | France | July 19, 1937 |

UNITED STATES PATENT OFFICE

CERTIFICATE OF CORRECTION

Patent No. 2,838,813　　　　　　　　　　　　　　　　　　June 17, 1958

Robert W. Naramore

It is hereby certified that error appears in the printed specification of the above numbered patent requiring correction and that the said Letters Patent should read as corrected below.

Column 1, line 48, for "head" read -- bead --; column 4, line 12, after "folded" insert -- loop --.

Signed and sealed this 2nd day of September 1958.

(SEAL)
Attest:

KARL H. AXLINE
Attesting Officer

ROBERT C. WATSON
Commissioner of Patents